Aug. 31, 1965 R. H. KAISER ETAL 3,203,637

TAPE TAKE-UP MEANS

Filed Jan. 18, 1963

INVENTORS
ROBERT H. KAISER
ALEXANDER N. NEILANDS

United States Patent Office 3,203,637

Patented Aug. 31, 1965

3,203,637
TAPE TAKE-UP MEANS

Robert H. Kaiser, Detroit, and Alexander N. Neilands, Union Lake, Mich., assignors to Burroughs Corporation, Detroit, Mich., a corporation of Michigan Filed Jan. 18, 1963, Ser. No. 252,381
2 Claims. (Cl. 242—71.8)

The present invention relates to tape-handling apparatus and specifically to a spool type reel for winding or unwinding flexible strip material such as film, ribbon, or tape. In the past, it has been difficult to design a tape storage reel which is simple in construction and which provides easy, rapid removal of the tape without disassembly of its parts. The present invention may be used as a supply reel for tape which is being fed to processing or other similar equipment; or may be used as a take-up reel which provides a roll of tape which may be conveniently stored for future use.

The reels which are commonly used for the winding and unwinding of tape, etc. comprise a hub having disc or flanges at each end thereof, providing a space in which the tape material may be wound around the hub. These reels are made so that one of the discs or flanges must be removed from the hub to enable the roll of tape to be removed. Reels having such a removable disc are relatively expensive to manufacture. Also, it is relatively difficult to load these reels because the tape end must be inserted into a slot somewhere on the periphery of the hub and the reel then rotated to secure the tape. If care is not taken in rotating the reel, the tape sometimes falls out of the slot. Another shortcoming of conventional reels is that the outside diameter of the hub cannot be varied and, accordingly, the inside diameter of the roll of tape is invariable.

One object of the present invention is to provide a tape reel which permits the initial portion of the tape to be easily wound about the hub of the reel.

Another object of the present invention is to provide a tape reel in which the wound roll of tape may be readily removed from the hub without the necessity of first removing one disc or flange of the reel.

Another object of the present invention is to provide a tape reel in which the roll of tape may be wound free from coning without the use of a second disc and in which tapes of various widths may be accommodated without adjustment of the reel.

A still further object of the present invention is to provide a tape reel of relatively simple construction which requires only one disc or flange and which is made of a relatively few inexpensive parts.

These and other objects will become more apparent from the following description and drawings in which like reference characters denote like parts throughout the several views.

Figure 1:
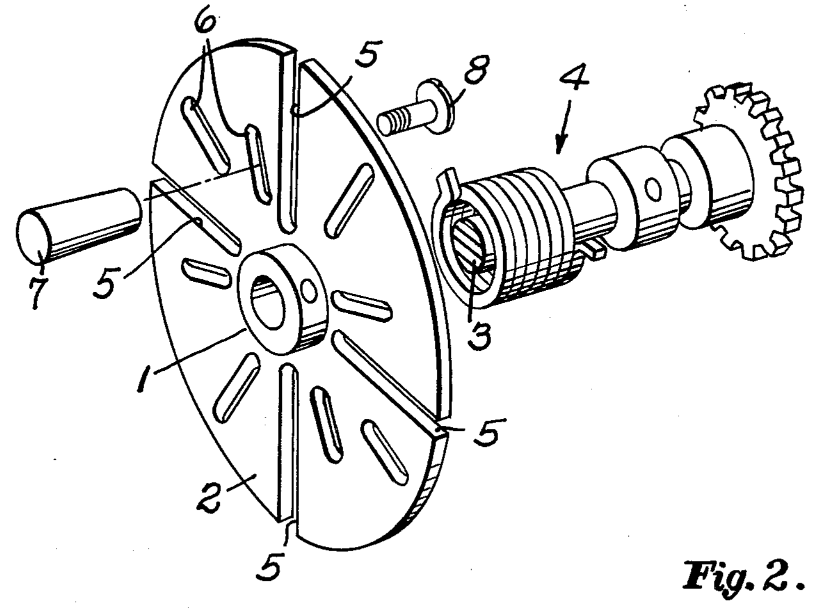
FIG. 1 is a perspective view of a reel incorporating the novel features of the present invention.

Referring to FIG. 1 there is shown a tape reel comprising a thin, flexible disc 2 fastened to a hub 1 making it rotatable and adaptable to connection with a slip clutch drive of conventional design. The disc 2 depends from the hub and is perpendicular to its longitudinal axis. Shaft 3 is attached at one end to the hub and at its other end to a slip clutch mechanism 4 of conventional design. Not illustrated are guide rolls or other conventional means for correctly positioning the tape so that it may be wound about the reel. The disc has thereon a plurality of grooves 5 which segment the disc into sectors and which enhance the flexibility of the disc. Contained within each sector are slots 6 which extend radially away from the hub and the center of the disc. In the various figures, two slots are shown as contained within each sector but any number of slots may be provided as will be discussed later. Associated with one of the slots of each sector is a tapered post 7. The smaller end of each post contains a threaded bore hole (not illustrated) which is intended to receive the threaded portion of bolt 8. In order to attach the tapered post to the disc, the bore hole is placed in register with the groove 6 somewhere along the length of the groove. When the tapered posts 7 are assembled by means of the bolts 8 to the disc 2, the axes of the posts 7 will be perpendicular to the disc. Of course, any other satisfactory manner of attachment could be used besides the one described. As is clearly shown in FIG. 3, when all the posts are attached to their associated sectors of the disc, the posts form the hub about which the tape is wound. In the illustrated embodiment, the disc comprises four sectors and four associated posts, although the number of sectors and associated posts could be varied without departing from the scope of the invention. The number of posts of course corresponds to the number of sectors. It is apparent that the diameter of the hub could be varied by placing the posts at different distances away from the center of the disc. This expedient permits the user of the reel to vary the inner diameter of the wound tape roll. Also, if it were desirable, a roll of tape could be wound which had a non-circular inner configuration. This would require only that the posts be unequally spaced from the center of the disc.

When tape is being wound upon the reel, the slight taper of the posts forming the hub causes the tape to hug the reel. In conventional tape reels, an additional symmetrical disc is attached to the hub and the tape is contained within the two discs as it is wound. If this additional disc or cover were not provided, the tape, as it was wound, would have a tendency to cone; i.e. at large diameters a portion of the roll of tape would tend to move away from the disc. The covers of these reels are friction mounted to the hub and are positioned by sliding them on the hub until they contact the roll of paper. When the roll consists of only a few turns, the cover sometimes crushes the tape and makes readout of this crushed portion impossible. In the present invention, however, the slight taper of the posts which form the hub cause the tape to hug the disc as it is wound. Thus, the necessity of an additional disc or cover is eliminated.

Figure 3:
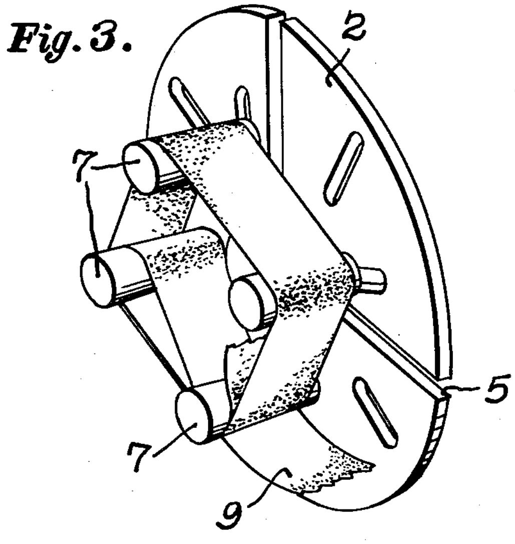
FIG. 3 is a perspective view of the reel of FIG. 1 after the initial end of a tape has been wound upon the reel.

In the present invention there is no need to use different reels or to adjust the position of a second disc on its hub in order to accomodate tapes of different widths. The posts 7, as shown at FIG. 3, permit a tape of any diameter to be wound about them as long as the tape width does not exceed the length of the posts. As the tape is wound about the hub formed by these posts, the slight taper of the posts causes the tape to hug the disc 2 and form a roll which is free from coning.

Figure 2:
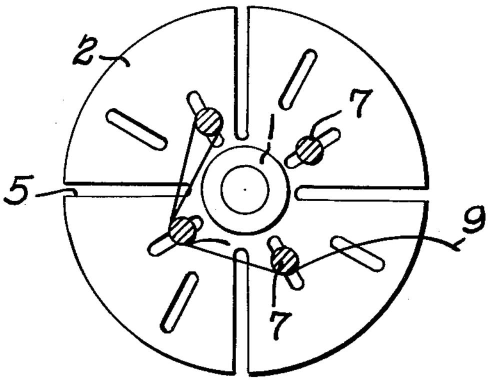
FIG. 2 is a front view of the reel showing the manner in which the tape is attached thereto in order to begin the winding of the tape.

As seen at FIGS. 2 and 3, the present invention provides a very simple method of threading a tape to begin the winding operation. A loop is formed with the initial end of tape 9. The winding reel need not be in any predetermined position in order to wind a tape thereupon. The loop is placed over one of the tapered posts, the free end of the tape being contained between the tape and a second adjacent post. A single rotation of the reel is sufficient to secure the tape in place for winding.

As is clearly seen at FIG. 1, the tapered posts 7 are adjustable in the slot in which they are attached. By providing a plurality of slots 6 in each sector, it is possible to form predetermined core diameters without measuring the distance of the posts from the center of the disc. The slots 6 are displaced so that their ends will locate the posts 7 in such a position that the resulting perimeter will establish the equivalent of the more common core diameters. The posts could also be set, as already discussed, to obtain any core diameter within the range of the slots.

The construction of the disc is such that its flexibility is a factor by which ease of tape removal is obtained. The tape is removed axially from the reel by sliding the roll off of the hub formed by the tapered posts. The resistance of the tape on the tapered posts causes the sectors to bow moving the ends of the posts inwardly. The posts, thus, offer little resistance to the removal of the roll. If the disc were not sufficiently flexible, the slight taper of the posts would make removal of the roll difficult because the larger ends of the tapered posts form a perimeter which is larger in diameter than the inner diameter of the roll of tape. The disc, as seen in the various figures, is a thin, flexible element segmented by grooves 5 to form sectors. However, if the disc 2 was manufactured so as to be sufficiently flexible to permit easy removal of the roll of tape, it would not be necessary to provide grooves 5 therein.

It is noted that satisfactory removal of the tape is effectively provided as long as the disc is flexible enough so that its flexure produces a sufficient inward bowing of the tapered posts. It has been found, however, that optimum ease of removal is obtained when the longitudinal taper of the posts 7 is approximately 1°, this taper being greatly exaggerated in FIGS. 1 and 3 for purposes of illustration.

While the form of the invention illustrated and described herein fulfills the aforesaid objects, it is to be understood that the invention is not confined to the embodiment disclosed herein, for it is susceptible of embodiment in various other forms.

What is claimed is:

1. A take-up means for receiving and storing tape in the form of a roll comprising a supporting shaft, a hub mounted on said shaft, a disc depending perpendicularly from the longitudinal axis of said hub, said disc being segmented to form flexible sectors, a plurality of staggered slots located in each sector, each slot extending radially from the center of said disc, a slightly tapered post associated with each of said sectors and mounted approximately perpendicularly to said disc, said post being slidably mounted in one of said slots located in said associated sector, the plurality of said posts together forming a variable diameter hub about which the tape is wound, said disc being capable of flexure under slight pressure so as to facilitate the removal of the wound roll of tape from said posts.

2. A reel for receiving a tape web in the form of a roll comprising a single flexible disc having a plurality of slots extending radially and dividing said disc into sectors, a plurality of tapered posts each attached to a different sector of said disc with the axes of said posts being extending perpendicularly therefrom, said posts spaced from the center of said disc and having their smaller ends adjacent said disc, each of said posts having a taper along its length of approximately 1°, said disc being capable of flexure under slight pressure for diverting the axes of said tapered posts from the perpendicular by at least the amount of said taper to permit removal of said tape, said tapered posts thereby forming a hub for said tape.

References Cited by the Examiner

UNITED STATES PATENTS

| | | | |
|---|---|---|---|
| 1,310,741 | 7/19 | Cook | 242—127 X |
| 1,567,138 | 12/25 | Hartman et al. | 242—110.3 X |
| 2,247,881 | 7/41 | Hatfield | 242—71.8 |
| 2,916,228 | 12/59 | Wellington | 242—76 |
| 3,098,617 | 7/63 | Day | 242—55.11 |

MERVIN STEIN, *Primary Examiner.*

UNITED STATES PATENT OFFICE

CERTIFICATE OF CORRECTION

Patent No. 3,203,637 August 31, 1965

Robert H. Kaiser et al.

It is hereby certified that error appears in the above numbered patent requiring correction and that the said Letters Patent should read as corrected below.

Column 4, line 22, strike out "being" and insert the same after "posts" in same line 22, same column 4.

Signed and sealed this 5th day of April 1966.

(SEAL)
Attest:

ERNEST W. SWIDER
Attesting Officer

EDWARD J. BRENNER
Commissioner of Patents